United States Patent
Calcev et al.

(10) Patent No.: US 9,622,156 B2
(45) Date of Patent: Apr. 11, 2017

(54) SYSTEM AND METHOD FOR EFFICIENT ACCESS NETWORK QUERY PROTOCOL (ANQP) DISCOVERY OF MULTIPLE ACCESS POINTS (APS)

(71) Applicant: FutureWei Technologies, Inc., Plano, TX (US)

(72) Inventors: George Calcev, Hoffman Estates, IL (US); Lin Cai, Schaumburg, IL (US); Xingxin Zhang, Chengdu (CN)

(73) Assignee: Futurewei Technologies, Inc., Plano, TX (US)

( * ) Notice: Subject to any disclaimer, the term of this patent is extended or adjusted under 35 U.S.C. 154(b) by 108 days.

(21) Appl. No.: 14/050,092

(22) Filed: Oct. 9, 2013

(65) Prior Publication Data

US 2014/0112325 A1    Apr. 24, 2014

Related U.S. Application Data

(60) Provisional application No. 61/748,673, filed on Jan. 3, 2013, provisional application No. 61/716,235, filed on Oct. 19, 2012.

(51) Int. Cl.
*H04W 48/16* (2009.01)
*H04W 84/12* (2009.01)
*H04W 48/12* (2009.01)

(52) U.S. Cl.
CPC ............ *H04W 48/16* (2013.01); *H04W 48/12* (2013.01); *H04W 84/12* (2013.01)

(58) Field of Classification Search
CPC ..... H04W 48/16; H04W 48/12; H04W 48/20; H04W 84/12

(Continued)

(56) References Cited

U.S. PATENT DOCUMENTS

2005/0130658 A1    6/2005  Stephens
2007/0064655 A1    3/2007  Ruuska
(Continued)

FOREIGN PATENT DOCUMENTS

CN    103096422 A     5/2013
JP    2009506698 A    2/2009
(Continued)

OTHER PUBLICATIONS

IEEE, "Draft Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 7: Fast Initial Link Setup," IEEE P802.11ai/D0.5, Mar. 2013, 105 pages.

(Continued)

*Primary Examiner* — Michael Thier
*Assistant Examiner* — Rownak Islam
(74) *Attorney, Agent, or Firm* — Slater Matsil, LLP

(57) ABSTRACT

An extension to the Access Network Query Protocol (ANQP) protocol allows stations (STAs) to discover multiple APs via a single ANQP request/response exchange. A STA can send a single ANQP request message to request information for multiple APs, e.g., two or more neighboring APs. The receiving AP may retrieve discovery information for one or more neighboring APs, and send an AP response message including the retrieved discovery information to the requesting STA. The ANQP request message identify the multiple APs for which discovery information is sought, and may specify which information is being requested for that corresponding AP.

28 Claims, 13 Drawing Sheets

(58) Field of Classification Search
USPC .... 370/338, 329, 328, 331, 310, 310.2, 254, 370/255

See application file for complete search history.

(56) References Cited

U.S. PATENT DOCUMENTS

| | | | |
|---|---|---|---|
| 2007/0064660 | A1 | 3/2007 | Qi et al. |
| 2010/0313020 | A1* | 12/2010 | Montemurro ....... H04L 63/0892 713/168 |
| 2011/0130149 | A1 | 6/2011 | Yao et al. |
| 2011/0205910 | A1 | 8/2011 | Soomro et al. |
| 2011/0280180 | A1 | 11/2011 | McCann et al. |
| 2011/0280225 | A1 | 11/2011 | Chen |
| 2011/0280228 | A1 | 11/2011 | McCann et al. |
| 2011/0299481 | A1* | 12/2011 | Kim ...................... H04W 48/14 370/329 |
| 2012/0076117 | A1 | 3/2012 | Montemurro et al. |
| 2012/0076118 | A1 | 3/2012 | Montemurro et al. |
| 2013/0070644 | A1* | 3/2013 | McCann ............. H04W 76/021 370/255 |
| 2013/0107757 | A1* | 5/2013 | Cherian ................ H04W 48/16 370/255 |
| 2013/0281056 | A1* | 10/2013 | Abraham ............. H04W 48/16 455/411 |
| 2013/0316705 | A1* | 11/2013 | Kneckt et al. ............. 455/435.1 |

FOREIGN PATENT DOCUMENTS

| | | | |
|---|---|---|---|
| JP | 2009509374 | A | 3/2009 |
| JP | 2009539296 | A | 11/2009 |
| WO | 2007029109 | A2 | 3/2007 |
| WO | 2007031855 | A2 | 3/2007 |
| WO | 2007040805 | A1 | 4/2007 |
| WO | 2010139058 | A1 | 12/2010 |
| WO | 2012061504 | A2 | 5/2012 |
| WO | 2012142437 | A1 | 10/2012 |

OTHER PUBLICATIONS

IEEE, "Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation," IEEE P802.11af/D2.0, Jul. 2012, 326 pages.

IEEE, "Standard for Information Technology—Telecommunications and information exchange between systems—Local and metropolitan area networks—Specific requirements; Part 11: Wireless LAN Medium Access Control (MAC) and Physical Layer (PHY) Specifications," IEEE Draft P802.11-REVmb/D12, Nov. 2011, 2910 pages.

IEEE, "P802.11ai/DO.2 Draft Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 7: Fast Initial Link Setup," IEEE P802.11ai/DO.2, Nov. 2012, 84 pages.

IEEE Computer Society, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Standards Association; IEEE Std 802.11-2012 (Revision of IEEE Std 802.11-2007), Mar. 29, 2012, 2793 pages.

IEEE, "Modification to the Amendment Text of white list of multiple APs GAS Query," That IEEE P802.11 Wireless LANs, IEEE 802.11-12/xxxxr0, Jan. 2013, 5 pages.

International Search Report and Written Opinion received in International Application No. PCT/CN2013/090115 mailed Mar. 27, 2014, 10 pages.

International Search Report and Written Opinion of Patent Cooperation Treaty (PCT), International Application No. PCT/US2013/065743, Applicant Huawei Technologies, Co., Ltd., date of mailing Feb. 5, 2014, 11 pages.

\* cited by examiner

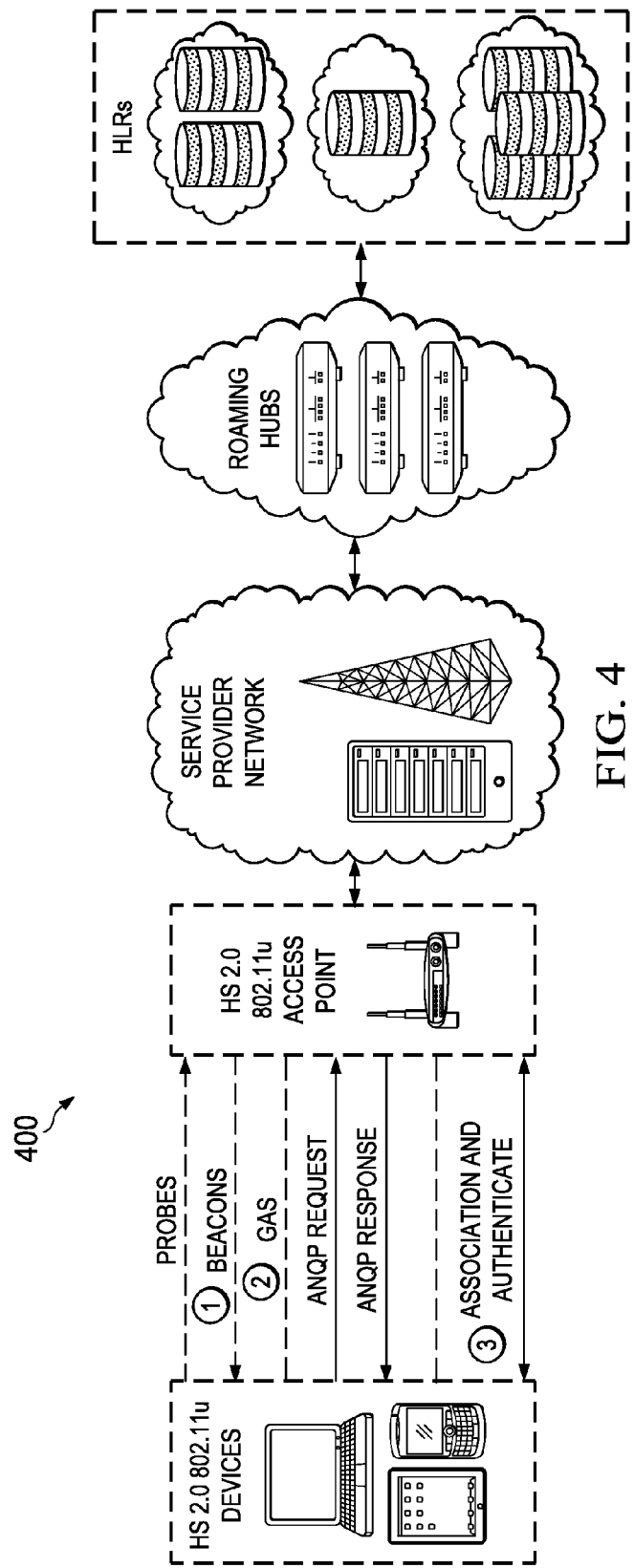

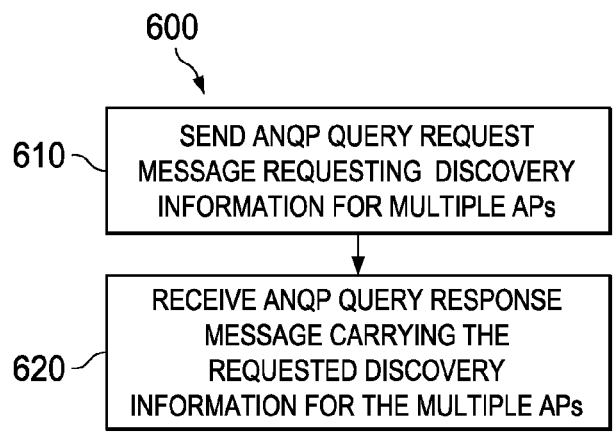
FIG. 6
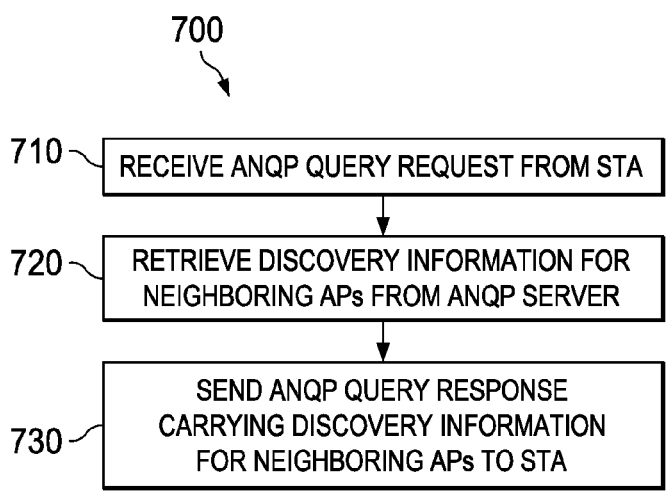
FIG. 7
| ANQP - ELEMENT NAME | INFO ID | ANQP ELEMENT (SUBCLAUSE) |
|---|---|---|
| NEIGHBOR REPORT | 272 | 8.4.4.18 |
| QUERY AP LIST | ANA | 8.4.4.19 QUERY AP LIST ANQP-ELEMENT |
| AP LIST RESPONSE | ANA | 8.4.4.20 AP LIST RESPONSE ANQP-ELEMENT |
| RESERVED | 273 - 56796 | N/A |
| VENDOR SPECIFIC | 56797 | 8.4.4.7 |
FIG. 8

| ANQP-ELEMENT NAME | ANQP-ELEMENT (SUBCLAUSE) | ANQP ELEMENT TYPE | AP | NON-AP STA | STA |
|---|---|---|---|---|---|
| ○○○ | ○○○ | ○○○ | ○○○ | ○○○ | ○○○ |
| NEIGHBOR REPORT | 8.4.4.18 | S | T | R | - |
| QUERY AP LIST | 8.4.4.19 | Q | T,R | T,R | T,R |
| AP LIST RESPONSE | 8.4.4.20 | S | T | R | - |
| SYMBOLS<br>Q ELEMENT IS AN ANQP QUERY<br>S ELEMENT IS AN ANQP RESPONSE<br>T ANQP-ELEMENT MAY BE TRANSMITTED BY MAC ENTITY<br>R ANQP-ELEMENT MAY BE RECEIVED BY MAC ENTITY<br>- ANQP-ELEMENT IS NEITHER TRANSMITTED NOR RECEIVED BY MAC ENTITY | | | | | |

FIG. 12

| ANQP-ELEMENT NAME | ANQP-ELEMENT (SUBCLAUSE) | ANQP-ELEMENT TYPE | BSS AP | BSS NON-AP STA | IBSS STA |
|---|---|---|---|---|---|
| QUERY LIST | 8.4.4.1 | Q | T, R | T, R | T, R |
| CAPABILITY LIST | 8.4.4.2 | S | T, R | T, R | T, R |
| VENUE NAME | 8.4.4.3 | S | T | R | — |
| EMERGENCY CALL NUMBER | 8.4.4.4 | S | T | R | — |
| NETWORK AUTHENTICATION TYPE | 8.4.4.5 | S | T | R | — |
| ROAMING CONSORTIUM | 8.4.4.6 | S | T | R | — |
| VENDOR SPECIFIC | 8.4.4.7 | Q, S | T, R | T, R | T, R |
| IP ADDRESS TYPE AVAILABILITY | 8.4.4.8 | S | T, R | T, R | T, R |
| NAI REALM | 8.4.4.9 | S | T | R | T, R |
| 3GPP CELLULAR NETWORK | 8.4.4.10 | S | T | R | — |
| AP GEOSPATIAL LOCATION | 8.4.4.11 | S | T | R | T, R |
| AP CIVIC LOCATION | 8.4.4.12 | S | T | R | T, R |
| AP LOCATION PUBLIC IDENTIFIER URI | 8.4.4.13 | S | T | R | T, R |
| DOMAIN NAME | 8.4.4.14 | S | T | R | — |
| EMERGENCY ALERT IDENTIFIER URI | 8.4.4.15 | S | T | R | T, R |
| TDLS CAPABILITY | 8.4.4.17 | Q, S | T, R | T, R | T, R |
| EMERGENCY NAI | 8.4.4.16 | S | T | R | — |
| NEIGHBOR REPORT | 8.4.4.18 | S | T | R | — |

SYMBOLS
  Q    ELEMENT IS AN ANQP QUERY
  S    ELEMENT IS AN ANQP RESPONSE
  T    ANQP-ELEMENT MAY BE TRANSMITTED BY MAC ENTITY
  R    ANQP-ELEMENT MAY BE RECEIVED BY MAC ENTITY
  —    ANQP-ELEMENT IS NEITHER TRANSMITTED NOR RECEIVED BY MAC ENTITY

| ELEMENT ID | LENGTH | BSSID | BSSID INFORMATION | OPERATING CLASS | CHANNEL NUMBER | PHY TYPE | OPTIONAL SUBELEMENTS |
|---|---|---|---|---|---|---|---|
| 1 | 1 | 6 | 4 | 1 | 1 | 1 | VARIABLE |

OCTETS:

FIG. 18

| B0 | B1 | B2 | B3 B4 | | B9 B10 | | B11 | B12 B31 |
|---|---|---|---|---|---|---|---|---|
| AP REACHABILITY | SECURITY | KEY SCOPE | CAPABILITIES | | MOBILITY DOMAIN | | HIGH THROUGHPUT | RESERVED |
| 2 | 1 | 1 | 6 | | 1 | | 1 | 20 |

BITS:

CAPABILITIES:

| B4 | B5 | B6 | B7 | B8 | B9 |
|---|---|---|---|---|---|
| SPECTRUM MANAGEMENT | QoS | APSD | RADIO MEASUREMENT | DELAYED BLOCK ACK | IMMEDIATE BLOCK ACK |
| 1 | 1 | 1 | 1 | 1 | 1 |

BITS:

| INFO ID | LENGTH | INFORMATION |
|---|---|---|
| 2 | 2 | VARIABLE |

OCTETS:

| ANQP-ELEMENT NAME | INFO ID | ANQP-ELEMENT (SUBCLAUSE) |
|---|---|---|
| RESERVED | 0-255 | N/A |
| QUERY LIST | 256 | 8.4.4.1 |
| CAPABILITY LIST | 257 | 8.4.4.2 |
| VENUE NAME | 258 | 8.4.4.3 |
| EMERGENCY CALL NUMBER | 259 | 8.4.4.4 |
| NETWORK AUTHENTICATION TYPE | 260 | 8.4.4.5 |
| ROAMING CONSORTIUM | 261 | 8.4.4.6 |
| IP ADDRESS TYPE AVAILABILITY | 262 | 8.4.4.8 |
| NAI REALM | 263 | 8.4.4.9 |
| 3GPP CELLULAR NETWORK | 264 | 8.4.4.10 |
| AP GEOSPATIAL LOCATION | 265 | 8.4.4.11 |
| AP CIVIC LOCATION | 266 | 8.4.4.12 |
| AP LOCATION PUBLIC IDENTIFIER URI | 267 | 8.4.4.13 |
| DOMAIN NAME | 268 | 8.4.4.14 |
| EMERGENCY ALERT IDENTIFIER URI | 269 | 8.4.4.15 |
| TDLS CAPABILITY | 270 | 8.4.4.17 |

FIG. 21

| ANQP-ELEMENT NAME | INFO ID | ANQP-ELEMENT (SUBCLAUSE) |
|---|---|---|
| EMERGENCY NAI | 271 | 8.4.4.16 |
| NEIGHBOR REPORT | 272 | 8.4.4.18 |
| RESERVED | 273-56796 | N/A |
| VENDOR SPECIFIC | 56797 | 8.4.4.7 |
| RESERVED | 56798-65535 | N/A |

FIG. 22

| NEW QUERY IDENTIFIER | REQUIRED ANQP ATTRIBUTE #1 | REQUIRED ANQP VALUE FOR ATTRIBUTE #1 | ○○○ | REQUIRED ANQP ATTRIBUTE #N | REQUIRED ANQP VALUE FOR ATTRIBUTE #N |

FIG. 23

| NEW QUERY IDENTIFIER | REQUIRED ANQP ATTRIBUTE #1 | REQUIRED ANQP VALUE FOR ATTRIBUTE #1 | ○○○ | REQUIRED ANQP ATTRIBUTE #N | EXCLUDED ANQP VALUE FOR ATTRIBUTE #N |

FIG. 24

SYSTEM AND METHOD FOR EFFICIENT ACCESS NETWORK QUERY PROTOCOL (ANQP) DISCOVERY OF MULTIPLE ACCESS POINTS (APS)

This application claims the benefit of U.S. Provisional Application No. 61/748,673 filed on Jan. 3, 2013, entitled "System and Method for GAS Query for AP list," and U.S. Provisional Application No. 61/716,235 filed on Oct. 19, 2012, and entitled "System and Method for GAS and ANQP Extension," both of which are incorporated herein by reference as if reproduced in their entireties.

TECHNICAL FIELD

The present invention relates to a system and method for wireless communications, and, in particular embodiments, to a system and method for efficient access network query protocol (ANQP) discovery of multiple access points (APs).

BACKGROUND

Mobile stations (STAs) may connect to wireless local area networks (WLANs) to access network services provided by network service providers. WLANs are commonly referred to as Wi-Fi networks and may operate in accordance with the institute of Electrical and Electronics Engineers (IEEE) standard 802.11-2012, which is incorporated herein by reference as if reproduced in its entirety. Prior to accessing a WLAN, a STA will typically perform an access network query protocol (ANQP) procedure to discover the characteristics and/or capabilities of serving Wi-Fi APs. By way of example, STAs may perform ANQP queries to determine whether a given Wi-Fi AP supports internet protocol (IP) version four (IPv4) or IP version six (IPv6), to determine which network providers (NPs) are associated with the Wi-Fi AP, to identify the Wi-Fi AP's vendor (or make), as well as other information associated with the Wi-Fi network.

SUMMARY

Technical advantages are generally achieved, by embodiments of this disclosure which describe a system and method for efficient ANQP query of multiple APs.

In accordance with an embodiment, a method for wireless local area network (WLAN) discovery is provided. In this example, the method includes receiving a request from a station (STA) when the STA roams into a coverage area. The request is received by one of multiple neighboring access points (APs) in the coverage area. The method further includes transmitting a response to the STA that includes discovery information for each of the multiple neighboring APs. An apparatus for performing this method is also provided.

In accordance with another embodiment, another method for wireless local area network (WLAN) discovery is provided. In this example, the method includes sending a request to an access point (AP) when a station (STA) roams into a coverage area. The AP is one of multiple neighboring APs in the coverage area. The method further includes receiving a response from the AP that includes discovery information for each of the multiple neighboring APs. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4 illustrates a diagram of a network architecture for supporting ANQP discovery;

FIG. 6 illustrates a flowchart of an embodiment method for performing ANQP discovery;

FIG. 7 illustrates a flowchart of another embodiment method for performing ANQP discovery;

FIG. 8 illustrates a table of ANQP element descriptions;

FIG. 12 illustrates a table of ANQP usage descriptions;

FIG. 14 illustrates a table of ANQP element descriptions;

FIG. 17 illustrates a diagram of an embodiment neighbor report format;

FIG. 18 illustrates a diagram of an embodiment BSSID information field format;

FIG. 19 illustrates a diagram of an embodiment capabilities subfield format;

FIG. 20 illustrates a diagram of an embodiment ANQP-element format;

FIG. 21 illustrates a table of ANQP elements;

FIG. 22 illustrates another table of ANQP elements;

FIG. 23 illustrates a diagram of an embodiment ANQP query format;

FIG. 24 illustrates a diagram of another embodiment ANQP query format;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Oftentimes, STAs will roam into an area or region that is served by multiple Wi-Fi access points (APs), and therefore may have several options for establishing a Wi-Fi link/connection. However, conventional ANQP discovery techniques only allow the STA to discover one AP at a time. As a result, STAs utilizing conventional ANQP discovery techniques may perform a separate ANQP discovery exchange with each of the Wi-Fi APs, which can delay initial link setup in Wi-Fi regions served by multiple Wi-Fi APs. Latencies associated with performing multiple ANQP discovery exchanges can significantly reduce the perceived quality of service (QoS) in Wi-Fi networks, as users may expect (or desire) near instantaneous access upon roaming into a WLAN. Accordingly, more efficient techniques for discovering multiple Wi-Fi APs are desired in order to expedite Wi-Fi link setup.

Aspects of this disclosure provide an extension to the ANQP protocol that allows STAs to discover multiple APs through a single ANQP request/response exchange. More specifically, a STA can send a single ANQP request message to request information for multiple APs, e.g., two or more neighboring APs. Upon receiving the ANQP request messaged, the receiving AP may retrieve discovery information for the multiple APs, and send an AP response message including the retrieved discovery information to the requesting STA. In embodiments, the ANQP request message may include an AP list field and a plurality of ANQP query subfields. The AP list field may include a plurality of AP identifiers (e.g., basic service set identifiers (BSSIDs)) to identify the multiple APs for which information is sought. Each of the ANQP query subfields may correspond to a different one of the multiple APs for which discovery information is sought, and may specify which information is being requested for that corresponding AP. The ANQP response message may include a plurality of AP query response subfields corresponding to the plurality of ANQP query subfields carried in the ANQP request message. Each ANQP query response subfield may provide the information requested by the corresponding ANQP query subfield.

Figure 1:
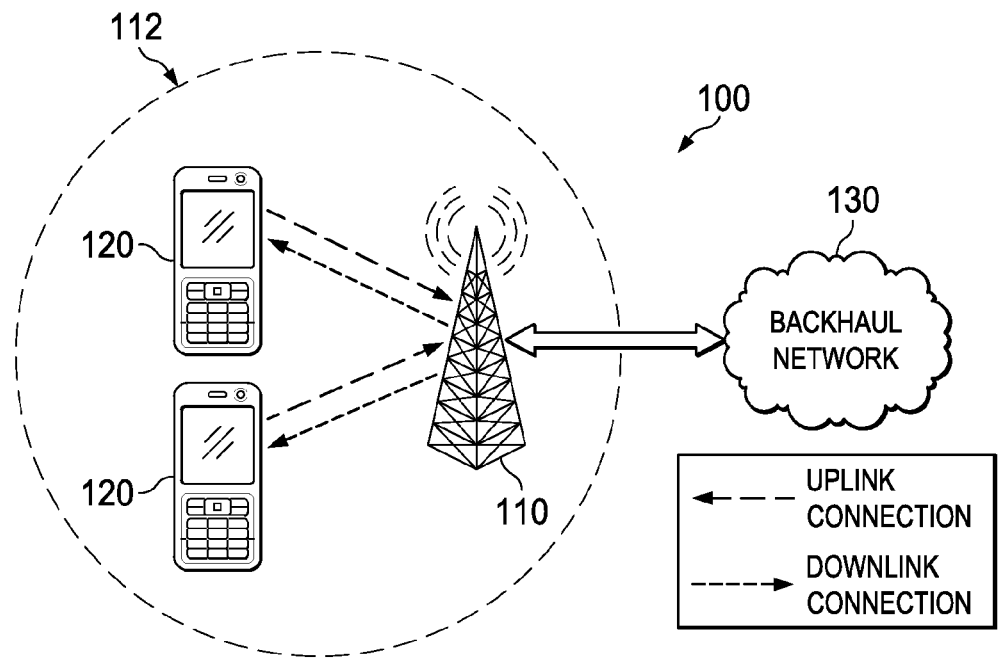
FIG. 1 illustrates a diagram of a wireless network for communicating data.

FIG. 1 illustrates a network 100 for communicating data. The network 100 comprises an access point (AP) 110 having a coverage area 112, a plurality of stations (STAs) 120, and a backhaul network 130. The AP 110 may comprise any component capable of providing wireless access by, inter alia, establishing uplink (dashed line) and/or downlink (dotted line) connections with the STAs 120, such as a base station, an enhanced base station (eNB), a femtocell, and other wirelessly enabled devices. The STAs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
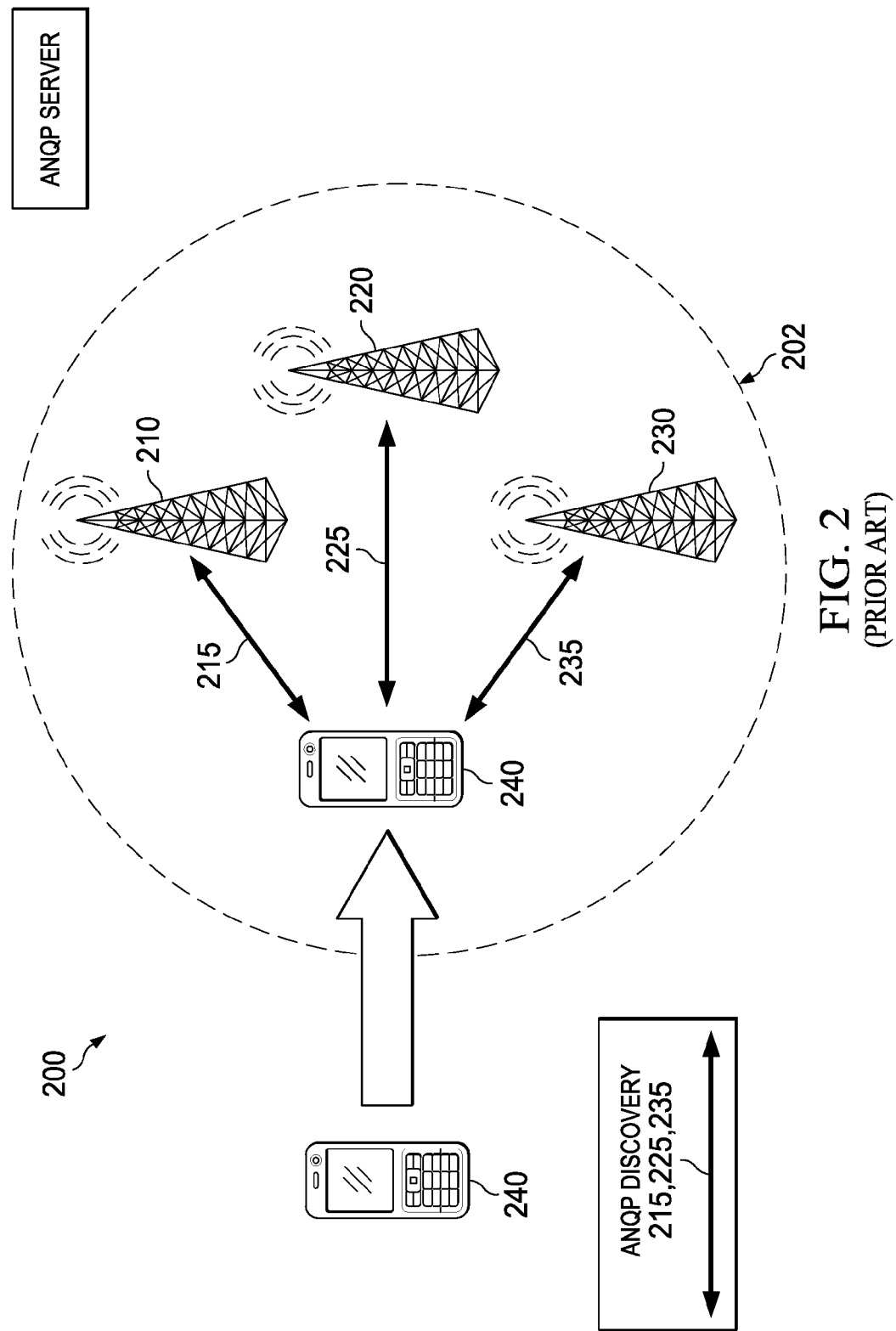
FIG. 2 illustrates a diagram of a network architecture for supporting a conventional ANQP discovery technique.

FIG. 2 illustrates a network 200 in which a STA 240 is configured to perform conventional ANQP discovery upon roaming into a coverage area 202. As shown, the network 200 includes a plurality of APs 210-230 configured to provide wireless access in the coverage area 202. The STA 240 is configured to perform conventional ANQP discovery, and therefore must execute separate ANQP discovery exchanges 215, 225, 235 with each of the APs 210, 220, 230 (respectively) in order to determine their respective characteristics and/or capabilities. Performing multiple ANQP discovery exchanges may significantly delay initial link setup of the STA 240, thereby reducing the perceived quality of service (QoS).

Figure 3:
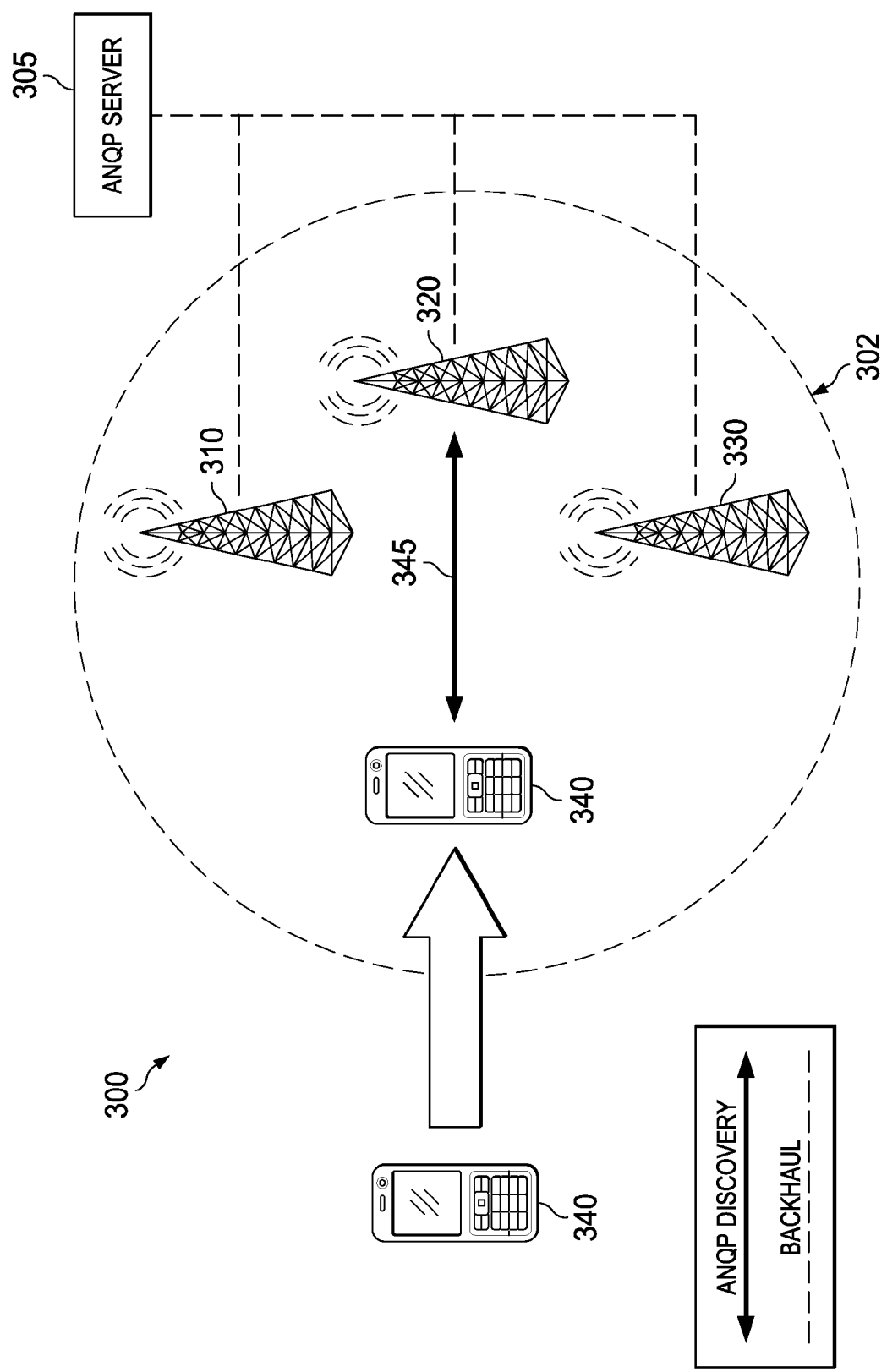
FIG. 3 illustrates a diagram of a network architecture for supporting an embodiment ANQP discovery technique.

Aspects of this disclosure provide embodiment ANQP discovery techniques that allow STAs to discover multiple APs in a single ANQP discovery exchange. FIG. 3 illustrates a network 300 in which a STA 340 is configured to perform an embodiment ANQP discovery technique upon roaming into a coverage area 302. More specifically, the STA 340 performs a single ANQP discovery exchange 345 with the APs 320 to obtain discovery information for each of the plurality of APs 310-330. In one example, the STA 340 sends a single ANQP request message to the AP 320 requesting discovery information for the APs 310-330. The AP 320 provides the requested discovery information to the STA 340 via a single ANQP response message. In some embodiments, the AP 320 retrieves discovery information for the neighboring APs 310, 330 from an ANQP server 305, or directly from the neighboring APs 310, 330, via a backhaul network. In other embodiments, some or all of the discovery information for the neighboring APs 310, 330 is a priori information of the AP 320.

FIG. 4 illustrates a network architecture 400 for performing an Access Network Query Protocol (ANQP) operation. As shown, STAs wanting to connect to a Wi-Fi network may scan an area for available Wi-Fi APs by, inter alia, detecting beacons and/or exchanging probe request/response messages. Once identified, the STA and Wi-Fi APs may exchange ANQP query requests and responses so that the STA may discover different features of the Wi-Fi APs. As discussed herein, STAs may include any wirelessly enabled device, such as a cell phone, laptop, tablet, smart sensor, handheld or consumer electronic device, and other user devices. STAs may comprise a Wi-Fi interface for accessing Wi-Fi networks, as well as other interfaces for interacting with other types of communication networks, such as a cellular network. An access point (AP) and one or more STAs can form a basic service set (BSS), which is the basic building block of an IEEE 802.11 wireless local area network (WLAN). An AP may communicate with an AP controller or an ANQP server, which can be collocated or not with the AP. A BSS generally can be identified by a service set identifier (SSID), which is configured and may be broadcasted by the AP.

Figure 5:
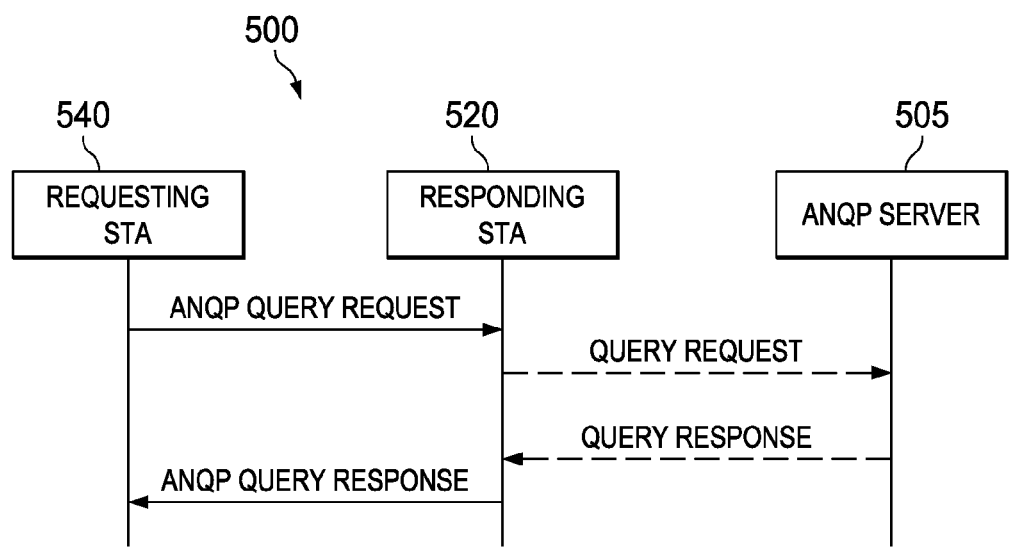
FIG. 5 illustrates a protocol diagram of an embodiment ANQP discovery procedure.

FIG. 5 illustrates an ANQP discovery procedure 500 between a requesting STA 540, a responding STA 520, and an ANQP server 505. In embodiments, the requesting STA 540 may be a mobile station or user device, while the responding STA 520 may be a Wi-Fi AP. As shown, the requesting STA 540 sends an ANQP query request message to the responding STA 520. The ANQP query request message may request discovery information for multiple APs. In one embodiment, the ANQP query request message includes an AP list field that list identifiers associated with each of the multiple APs for which discovery information is sought. In other embodiments, the ANQP query request message includes a generic request indicator that requests discovery information for APs in a given coverage area. For example, the responding STA 520 may be a Wi-Fi AP, and then generic request indicator may request discovery information for neighboring APs of the STA 520. Upon receiving the ANQP query request message, the responding STA 520 retrieves the requested discovery information by exchanging query request/response messages with the ANQP server 505 or via the cached information at the AP. Thereafter, the responding STA 520 provides the retrieved discovery information to the requesting STA 540 via an ANQP query response message.

FIG. 6 illustrates a method 600 for performing ANQP discovery, as might be performed by a requesting STA, e.g., a mobile station, etc. As shown, the method 600 begins with step 610, in which the requesting STA sends an ANQP request message requesting discovery information for multiple APs. Thereafter, the method proceeds to step 620, where the requesting STA receives an ANQP query response message carrying the requested discovery information of the multiple APs.

FIG. 7 illustrates a method 700 for performing ANQP discovery, as might be performed by a Wi-Fi AP. As shown, the method 700 begins with step 710, where the Wi-Fi AP receives an ANQP query request message from a STA that requests discovery information for multiple APs, including neighboring APs of the Wi-Fi AP. Thereafter, the method 700 proceeds to step 720, where the Wi-Fi AP retrieves discovery information for neighboring APs from an ANQP server. Subsequently, the method 700 proceeds to step 730, where the Wi-Fi AP sends an ANQP query response carrying discovery information for neighboring APs to the STA.

FIG. 8 illustrates a table of Access Network Query Protocol (ANQP) element descriptions. The Query List ANQP-element provides a list of identifiers of ANQP-elements for which the requesting STA is querying. Each ANQP-element may be returned in response to Query AP List ANQP-element. In some embodiments, a STA may include an inclusion selection filter or 'white' list element to indicate selection for a set of APs to be included as part of Neighbor Report ANQP element in an ANQP query response.

Figure 9:
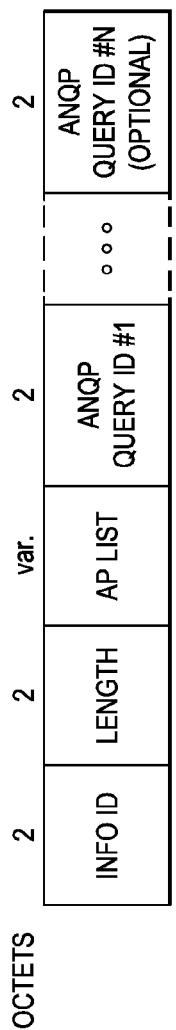
FIG. 9 illustrates a diagram of an embodiment ANQP query request message.
Figure 10:
FIG. 10 illustrates a diagram of an embodiment AP list field.

FIG. 9 illustrates an embodiment ANQP query request message that includes a Query AP List ANQP-element. The Info ID is a 2-octet field whose value is drawn from a table (e.g., Table 8-184ai01 in IEEE 802.11) corresponding to the Query AP List ANQP-element. The Length is a 2-octet field whose value is set to twice the number of ANQP Query ID fields. The AP List is a variable length field that contains a list of AP IDs. The list of AP IDs may identify the multiple IDs for which discovery information is sought. Each AP identifier subfield may comprise six octets and may indicate the BSSID of an AP for which discovery information is sought. Each ANQP Query ID field may request discovery information for one or more of the Wi-Fi APs listed in the AP list field. In some embodiments, a STA may include an Info ID in the Query List ANQP-element to request that the ANQP-element corresponding to that Info ID be returned in the ANQP query response. The Info IDs included in the Query List ANQP-element format, which may be included in an ANQP query request. As shown, the AP list field format includes AP identifiers of APs for which discovery information is sought.

Figure 11:
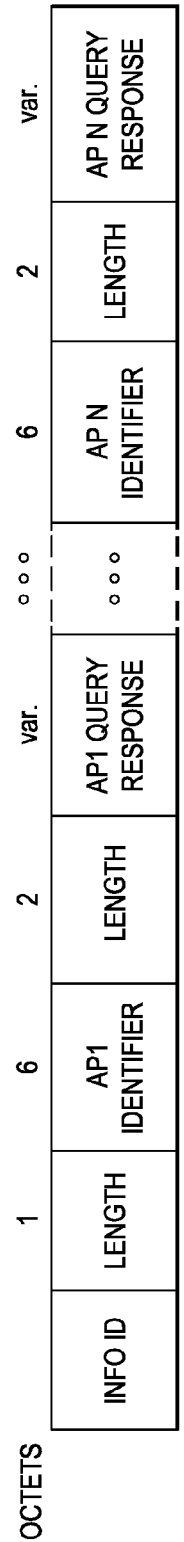
FIG. 11 illustrates a diagram of an embodiment ANQP query response message.

FIG. 11 illustrates an ANQP query response message that includes an AP List Response element. The AP list response element may be communicated in response to a Query AP list request. The Info ID is a 2-octet field whose value is drawn from a table (e.g., Table 8-184ai01 in IEEE 802.11) corresponding to the AP List Response ANQP-element. The Length subfield is a 1-octet field whose value is set to the number of corresponding AP Identifier entries in the AP List Response ANQP element. The Length subfield is a 2-octet field whose value is set to the number of octets in the following AP Query Response field. Default AP Response subfield is the generic container whose value is the receiving AP response to a GAS Query. This field is formatted in accordance with the protocol specified in the Advertisement Protocol element. The AP Identifier subfield takes 6 octets to indicate the BSSID of an AP that the requesting STA wants to query.

The following AP Query Response field is a generic container whose value is the BSSID dependent response to a GAS Query. This field is also formatted in accordance with the protocol specified in the Advertisement Protocol element. FIG. 12 illustrates an ANQP usage table.

In some embodiments, a Query AP List ANQP-element may be used by a requesting STA to perform an ANQP Query for each AP indicated in the AP list. The requesting STA may include Info IDs in the Query List ANQP element that have the ANQP-element type. Info IDs that have an ANQP element type of Q may be excluded from the Query AP List ANQP-element (e.g., the Info ID for Vendor Specific ANQP-element shall not be included). A responding STA that encounters an unknown or reserved ANQP Info ID value in an Query AP List ANQP element received may ignore that ANQP Info ID as well as parse any remaining ANQP Info IDs. In response to a Query AP List, a Query Response field may contain an AP List Response ANQP element. The AP List Response may include a query response report for the APs indicated in the Query AP List in the increased order of the AP Identifier.

Aspects of this disclosure provide an extension to the GAS protocol that allows STAs to discover multiple APs through a single GAS discovery exchange. More specifically, a STA can send a single GAS request message to request discovery information for multiple APs, e.g., two or more neighboring APs. Upon receiving the GAS request messaged, the receiving AP may retrieve discovery information (about)/for the multiple APs, and send an AP response message including the retrieved discovery information to the requesting STA. In embodiments, the GAS request message may include an AP list field and a plurality of GAS query subfields. The AP list field may include a plurality of AP identifiers (e.g., basic service set identifiers (BSSIDs)) to identify the multiple APs for which discovery information is sought. Each of the GAS query subfields may correspond to a different one of the multiple APs for which discovery information is sought, and may specify which discovery information is being requested for that corresponding AP. The GAS response message may include a plurality of AP query response subfields corresponding to the plurality of GAS query subfields carried in the GAS request message. Each GAS query response subfield may provide the discovery information requested by the corresponding GAS query subfield. Aspects of this disclosure discussed in the context of ANQP can be extended to other GAS protocols, such as the Registered Location Query Protocol (RLQP) described in IEEE 802.11af (2012), which is incorporated by reference herein as if reproduced in its entirety. For example, a devices operating in a white space environment (e.g., an IEEE 802.11af network) may send an RLQP request to one transmit point asking for information (e.g., available channels, power levels, location, etc.) related to neighboring transmit points.

In IEEE 802.11REVmb D12, section 10.24.3 describes interworking procedures with generic advertisement service (GAS). GAS may be used to enable network selection for STAs when dot11InterworkingServiceActivated is true. GAS provides transport mechanisms for advertisement services while STAs are in the unassociated state as well as the associated state. This is accomplished via the use of Public Action management frames, which are Class-1 frames. GAS messages are transmitted using individually-addressed Public Action frames. When management frame protection is negotiated, stations use individually addressed Protected Dual of Public Action frames instead of individually addressed Public Action frames.

Figure 13:
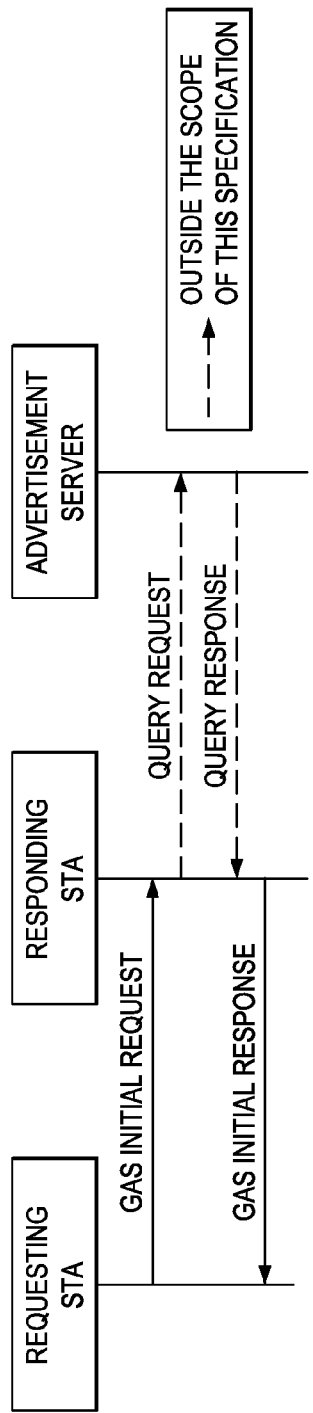
FIG. 13 illustrates a protocol diagram of an embodiment generic advertisement service (GAS) discovery technique.

Section 10.24.3.1 (of 802.11 REVmb-D12) describes the GAS protocol. The presence of the Interworking element in Beacon or Probe Response frames indicates support for the GAS protocol. The presence of the Advertisement Protocol element in Beacon or Probe Response frames indicates the Advertisement Protocol IDs supported in the basic service set (BSS) or independent BSS (IBSS). A STA transmits a GAS Query Request in a GAS Initial Request frame and the responding STA provides the GAS Query Response or information on how to receive the GAS Query Response in a GAS Initial Response frame. The GAS Query Response is delivered in a single GAS Initial Response frame or in one or more GAS Comeback Response frames. The GAS Query Response is not split between a GAS Initial Response frame and one or more GAS Comeback Response frames. FIG. 13 illustrates a GAS message sequence with dot11GASPauseForServerResponse equal to true.

Section 10.24.3.2.2 describes the Query List procedure. The Query List ANQP-element is used by a requesting STA to perform an ANQP Query using the procedures defined in 10.24.3.2.1. The requesting STA only includes Info IDs in the Query List ANQP element that have the sole ANQP-element type of S as shown in Table 10-10, which is illustrated in FIG. 14. Info IDs that have an ANQP element type of Q are not included in the Query List ANQP-element (e.g., the Info ID for Vendor Specific ANQP-element is not included). A responding STA that encounters an unknown or reserved ANQP Info ID value in an ANQP Query list received without error ignores that ANQP Info ID and parses any remaining ANQP Info IDs.

Figure 15:
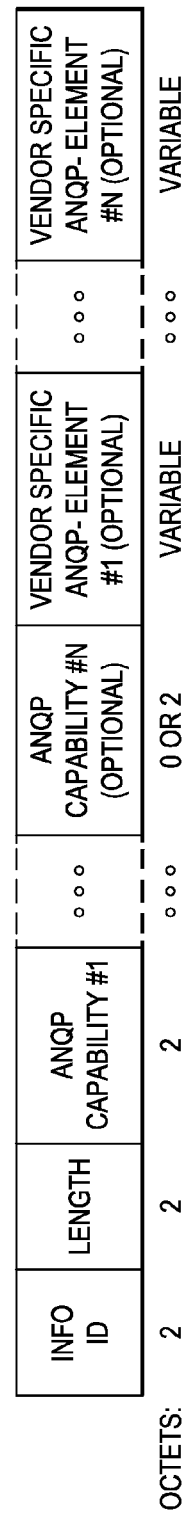
FIG. 15 illustrates a diagram of an embodiment Capability List ANQP-element format.

Section 8.4.4.2 describes the Capability List ANQP-element. The Capability List ANQP-element provides a list of information/capabilities that has been configured on a STA. The Capability List ANQP-element is returned in response to Query List ANQP-element containing the Info ID of the Capability List ANQP-element. FIG. 15 illustrates the Capability List ANQP-element format.

Section 4.3.8.10 describes a neighbor report. A neighbor report request is sent to an AP, which returns a neighbor report containing information about known neighbor APs that are candidates for a service set transition. Neighbor reports contain information from the table dot11RMNeighborReportTable in the MIB concerning neighbor APs. This request/report pair enables a STA to gain information about the neighbors of the associated AP to be used as potential roaming candidates.

Figure 16:
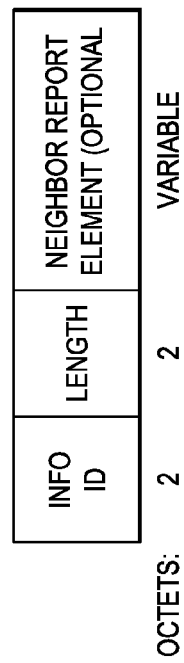
FIG. 16 illustrates a diagram of an embodiment neighbor report ANQP-element format.

Section 8.4.4.18 describes a neighbor report ANQP-element, which is illustrated in FIG. 16. The neighbor report ANQP-element provides zero or more neighbor reports, the format of which is illustrated in FIG. 17, about neighboring APs. This is of benefit to a STA in a pre-associated state. The basic SSID (BSSID) is the BSSID of the BSS being reported. The subsequent fields in the Neighbor Report element pertain to this BSS. The BSSID information field can be used to help determine neighbor service set transition candidates. It is four octets in length and contains the subfields as shown in FIG. 18.

The Capabilities Subfield contains selected capability information for the AP indicated by this BSSID. The bit fields within this subfield have the same meaning and are set to the equivalent bits within the Capability Information field (see section 8.4.1.4) being sent in the beacons by the AP being reported. The format of the Capabilities subfield is shown in FIG. 19.

Section 8.4.4 describes ANQP elements. ANQP-elements are defined to have a common format consisting of a 2-octet Information Identifier (Info ID) field, a 2-octet length field, and a variable-length element-specific information field. Each element is assigned a unique Info ID as defined in the standard. The ANQP-element format is shown in FIG. 20.

The ANQP-elements that may be configured are listed in Table 8-184 as shown in FIGS. 21-22. If information is not configured for a particular ANQP-element, then a query for that element returns that element with all optional fields not present.

Section 10.11.10.2 describes the requesting of a neighbor report. A STA requesting a neighbor report from an AP sends a neighbor report request frame to its associated AP. Section 10.11.10.3 describes the receiving of a neighbor report. If dot11RMNeighborReportActivated is true, an AP receiving a neighbor report request responds with a neighbor report response frame containing zero or more neighbor report elements. If an SSID element is specified in the corresponding neighbor report request frame, the neighbor report element(s) contain information only concerning neighbor APs that are members of the current extended service set (ESS) identified by the SSID element contained within the neighbor report request. If the SSID element is omitted, the neighbor report element(s) shall contain information concerning neighbor APs that belong to the same ESS as the requesting STA. If the wildcard SSID element is specified in the corresponding neighbor request frame, the neighbor report element(s) contain information concerning all neighbor APs. If there are no neighbor APs available, the AP sends a neighbor report response frame with no neighbor report elements.

If dot11RMNeighborReportActivated is false in an AP receiving a neighbor report request, it ignores the request and returns a neighbor report frame with the incapable bit in the measurement report mode field set to 1. A STA receiving a neighbor report element with an unknown sub-element identifier ignores the unknown sub-element and continues to process remaining sub-elements. A STA receiving a neighbor report element containing a vendor specific sub-element with an unknown organization identifier ignores this vendor specific sub-element and continues to process any remaining vendor specific sub-elements. A serving AP includes a timer synchronization function (TSF) information sub-element in the neighbor report element if it is able to guarantee an accumulated error of 1.5 time unit (TU) or better on the TSF offset subfield. Otherwise, the AP does not include a TSF information sub-element in the neighbor report element.

Again, section 8.4.4.18 describes the neighbor report ANQP-element, shown in FIG. 16. The neighbor report ANQP-element provides zero or more neighbor reports about neighboring APs, which is of benefit to a STA in a pre-associated state. The info ID field is equal to the value in Table 8-184, shown in FIGS. 21-22, corresponding to the neighbor report ANQP-element. The length is a 2-octet field whose value is set to the number of octets in the neighbor report field. The format of the neighbor report element is shown in FIG. 17, as defined in section 8.4.2.39. The element ID and the length fields of the neighbor report element, as shown in FIG. 17, are not included.

Generally, a mobile device cannot get ANQP information for more than one AP, and because there is no interface between ANQP server and the device, it can just get ANQP information for the AP via the air interface between it and the AP; otherwise, it cannot get ANQP information.

An embodiment provides an interface between the ANQP server and devices, where the devices can get ANQP information for more than one AP via a query-response message procedure. An embodiment provides an extension for GAS protocols (e.g., ANQP, RLQP, etc.) for obtaining neighboring AP information. In an embodiment method a STA combines various ANQP attributes and their expected values via logical operators in a single query. The receiving AP replies to this query with a list of neighboring APs that satisfy the logical condition.

An embodiment provides a reduction in overhead and speeds up the process of network discovery and selection, before association as well as during handover. An embodiment reduces the over the air channel contention, the communication overhead and the latency for network discovery and selection. Embodiments may be implemented in wireless access networks and devices, such as Wi-Fi mobile devices supporting Hotspot 2.0 and ANQP server, Wi-Fi STAs, Wi-Fi APs, ANQP servers, and the like.

An embodiment provides an extension of the original GAS and ANQP protocol proposed in 802.11u to allow a STA to send complex GAS requests to an AP (generally called serving AP) asking for the ANQP information available at the neighboring APs, before or after association, or asking for the list of neighboring APs that satisfy a logical condition of the ANQP attributes. This extension is also applicable to other GAS protocols, such as RLQP as defined in the IEEE 802.11af. This speeds up the process of network discovery and selection as well as the handover between neighboring APs or Hotspots. The neighboring APs can operate in the same or different radio frequency (RF) channel or RF frequency bands.

In an embodiment, the serving AP keeps local information about its neighboring APs in a local ANQP server or ANQP cache.

In another embodiment the serving AP can receive the GAS Request for the neighboring APs and tunnel this request to its neighboring APs over DS via an AP to AP communication (for instance similar to the Fast Transition Protocol)

In another embodiment, when receiving the ANQP query, the serving AP may forward it to the ANQP server, which sends the requested ANQP information to the serving AP, and finally the serving AP sends the request ANQP information to the STA. In this embodiment the ANQP server could store information related to a plurality of APs and select a subset of these APs based on the received query. In a different embodiment the ANQP server is able to interface with other ANQP servers (collocated in the same network or that belong to different networks) and request information from these ANQP servers based on the received ANQP complex query. In a different embodiment the ANQP server could interface with other network elements that belong to a different network than WiFi, for instance an ANDSF server from a 3GPP network, and request information in order to answer to the ANQP complex query.

In an embodiment, the extension is referred to as neighbor provisioning information (NPI), although other names may be given to the extension. When an AP signals in its beacon or in a probe response support for internetworking (and therefore for the ANQP protocol), and the presence of NPI enabled bit (as provided in an embodiment), this is interpreted as the AP being able to provide the ANQP information for its neighbors as well. In addition, when the NPI is enabled the AP can optionally present in the beacon or probe response the list of the BSSIDs of its neighbors for which it has information. In an alternative embodiment the beacon also contains a sequence number to identify the freshness of the information for each of its neighbors in the neighbor list.

A STA that receives a beacon with NPI enabled may send a GAS request for all or a subset of the neighboring APs using the provided list of BSSIDs. In a different embodiment, the STA can compare a freshness indicator (such a sequence number or a time stamp) presented in the beacon for a specific neighbor and decide whether to request the information associated with that neighbor.

In another embodiment, when the neighboring AP list is not provided in a beacon or probe response, the requesting STA sends a request asking for the list of neighboring APs. The request can be a general request for a list of all neighboring APs, or it can be a filtered request, based on a set of ANQP/RLQP attributes values or other selection criteria, of a subset of the neighboring APs. For instance, the requesting STA could ask: "Send me the list of all neighboring APs," or "Send me the list of all ANQP attributes associated with the following list BSSIDs." In an embodiment the request contains a logical combination of criteria used to retrieve the information, where this type of query may be referred to as a Composed ANQP Query. For instance, a requesting STA can ask "Send me the list of all ANQP attributes associated with the following list BSSIDs, AND have the WAN throughput larger than a specific threshold." When the serving AP receives a Composed ANQP Query request, it checks the local cache to find the subset of neighboring APs that satisfy the filtered request and it communicates the subset to the requesting STA.

In another embodiment, the ANQP information is divided into common ANQP information and specific ANQP information. The common ANQP information is that information that is common to several neighbor APs, (for instance in the same electronic switching system (ESSS)) while the specific ANQP information is the information that is specific to an individual AP. When receiving a neighbor ANQP information request, an AP may send just one copy of common ANQP information for all neighbor APs. For RLQP, the requested information may be specific to a set of APs operating in or near a common geographical location.

In a different embodiment, if the serving AP does not maintain local information about its neighboring APs; it sends the request to each neighboring AP. When sending a request to neighboring APs, the serving AP starts a timer for receiving all the responses from its neighbors. After the timer expiration the AP sends back the information received from its neighbors to the requesting STA. In a different embodiment, the serving AP sends the received information from the neighboring AP as soon as it receives it. In this embodiment the requesting STA can stop the AP from sending more information on its neighbors at any time based on the information received so far.

In an embodiment, the serving AP stores locally the ANQP information related to its neighbors. This information is updated periodically via requests from the serving AP to its neighbors, or from an information server such as ANQP server or as per event based via the event-triggered updates from the neighboring AP.

If in the end, the serving AP cannot provide the request ANQP information, it may respond to the STA a message that shows it fails to provide the ANQP information, and the failure reason, for example, could be no such neighbor AP, no cached, time out, and so on.

An embodiment method allows a STA to query about ANQP attributes for multiple APs at the same time. An embodiment method focuses mainly on network discovery and selection in the Hotspot (Passpoint), which is different from the Neighbor Report procedure that is dedicated to support the Fast Transition (FT) feature. For example, the query is sent to the serving AP (no association necessary) that can provide its neighbors ANQP information. This is different from the Neighbor Report Request sent to the associated AP. The querying STA is not necessarily associated to the serving AP.

As another example, the STA does not necessarily provide the list of the neighboring APs in the ANQP query; it asks the list of neighboring APs that have some particular value(s) for ANQP attribute(s).

Further, the Neighbor Report Request and Response do not send ANQP Queries; rather the purpose is to get information about the neighbor APs that could later respond (support) the ANQP queries. An embodiment method explicitly allows a STA to send ANQP query requesting the ANQP information from the neighboring APs via the serving AP An embodiment provides a Composed ANQP Query that contains a logical combination of logical conditions for ANQP attributes and values (thresholds) as way to return a subset of all neighboring APs (hotspots) that satisfy some logical criteria.

An embodiment provides a Composed ANQP query that contains an AP group identifier. The ANQP group identifier may be included in place of, or in addition to, a list of AP identifiers. The AP or the ANQP server recognizes the group and provides the ANQP attributes values for the AP that belongs to that group identifier.

An embodiment method extends the Neighbor Report Format with a few mandatory fields. The query may or not be followed by other queries sent directly to the neighboring APs for supplemental information.

The information ANQP Capability is Neighbor Report (Info ID=272). When an AP receives a composed ANQP query it replies with an Enhanced Neighbor Report where the following elements are added to those presented in FIG. 17: Interworking support indication; Hotspot2 support indication; Optional Elements—the ANQP attributes as described in FIG. 20; and Optional Elements—the additional ANQP attributes as described in the Hotspot 2.0 (Release 2).

The Enhanced Neighbor List contains the list of neighboring APs that have ANQP attributes that match the composed ANQP query. An AP is identified in the returned list via its BSSID or SSID or HESSID information. Example embodiments of the composed ANQP query are shown in FIGS. 23-24, although many other formats are possible.

An embodiment for wireless communication includes a first station that accesses the network. The first station sends a probe-attach-request (or probe-connection-request) message. The probe-attach-request message includes one or more condition parameters. The condition parameter could be one of SSID (or a list of SSID), operator friendly name (or a list of friendly name), operator ID (or a list of operator ID), BSSID (or a list of BSSID), public land mobile network (PLMN) ID (or a list of PLMN ID), network capability (for example, quality of service (QoS), multiple-input multiple output (MIMO), antenna number, bandwidth, load level, fast initial link setup, and so on), authentication method (for example, the condition parameter indicates that the authentication method is extensible authentication protocol (EAP) or wired equivalent privacy (WEP) or Open), base station ID (or a list of base station ID), or a combination of them. The list presented in this embodiment is an exemplification only, and other parameters could be included in the probe-attach-request message.

When a second station (for instance an access point or a base station) receives the probe-attach-request message, it checks whether it satisfies the condition. For example, if the condition parameter is an SSID value, the second station checks whether its SSID is the same as the SSID value in the condition parameter (if the condition parameter is a list of SSIDs, the second station checks whether its SSID belongs to the SSID in the list). If its SSID is the same as the SSID (or belongs to the list), it responses with a message (which may be named Probe-attach-Response), which may include the second station's ID (or address), an indicator showing that it allows the first station to attach (or to connect) (or an indicator showing it satisfies the condition and process the next step). When receiving such a probe-attach-response, the first station may response with a confirmation message (which may be named Probe-attach-confirmation) to the second station to confirm the receiving of the response message.

When the first station receives more than one probe-attach-response from different stations (this would happen when several APs satisfy the condition in the message they will all response to the first station), the first station may select one of them and respond with a confirmation message to the selected station. To those unselected stations, the first station may also send a message to each of them (or a broadcast message to all of them) to indicate that they are not selected. Another option is that to those unselected stations, the first station may not send messages to them, where those unselected stations wait for a timer to expire. If the timer expires before a confirmation message is received, they will consider themselves as un-selected, and behave appropriately.

There are several detailed implementation options of this embodiment method. One implementation option is, besides the condition parameter, the Probe-attach-request could also include an authentication start request (and may also include some security parameters, or itself is an authentication start message and includes condition parameter). When the second station receives the request, it may start the authentication procedure if it satisfies the condition and decides to process forwardly. In this case, the Probe-attach-response message may also contain security parameters to continue the authentication procedure, while the Probe-Attach-Confirmation could include an association request and/or other authentication information. The detailed information about authentication and security parameters can be referred to in IEEE 802.11-2007 standards specification or later versions, or IETF-related specs.

Another implementation option is that the Probe-attach-request includes an association request (detailed information about association response can be referred to in 802.11-2007 specification or later versions) or a connection request (detailed information about connection request can be referred to in 3GPP TS25.331 or TS36.331). The Probe-attach-response include an association response (detailed information about association response can be referred to in 802.11-2007 specification or later versions) or a connection response (detailed information about connection request can be referred to in 3GPP TS25.331 or TS36.331).

Another implementation option is that the Probe-attach-request includes an open system authentication condition and an association request, while the Probe-attach-response includes an association response and authentication confirmation information. The detailed of association information and authentication information can be referred to in 802.11-2007 specification or later versions, or IETF-related specs.

Figure 25:
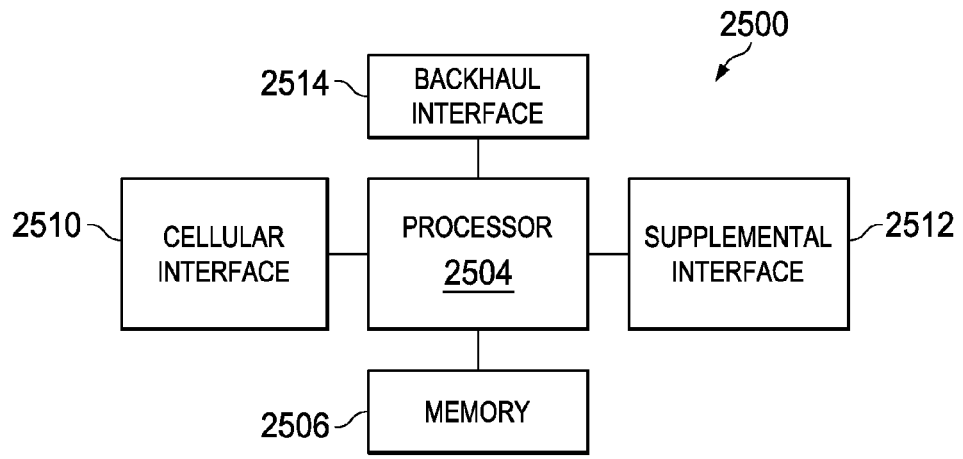
FIG. 25 illustrates a block diagram of an embodiment communications device.

FIG. 25 illustrates a block diagram of an embodiment of a communications device 2500, which may be equivalent to one or more devices (e.g., UEs, NBs, etc.) discussed above. The communications device 2500 may include a processor 2504, a memory 2506, a cellular interface 2510, a supplemental interface 2512, and a backhaul interface 2514, which may (or may not) be arranged as shown in FIG. 25. The processor 2504 may be any component capable of performing computations and/or other processing related tasks, and the memory 2506 may be any component capable of storing programming and/or instructions for the processor 2504. The cellular interface 2510 may be any component or collection of components that allows the communications device 2500 to communicate using a cellular signal, and may be used to receive and/or transmit information over a cellular connection of a cellular network. The supplemental interface 2512 may be any component or collection of components that allows the communications device 2500 to communicate data or control information via a supplemental protocol. For instance, the supplemental interface 2512 may be a non-cellular wireless interface for communicating in accordance with a Wireless-Fidelity (Wi-Fi) or Bluetooth protocol. Alternatively, the supplemental interface 2512 may be a wireline interface. The backhaul interface 2514 may be optionally included in the communications device 2500, and may comprise any component or collection of components that allows the communications device 2500 to communicate with another device via a backhaul network.

Figure 26:
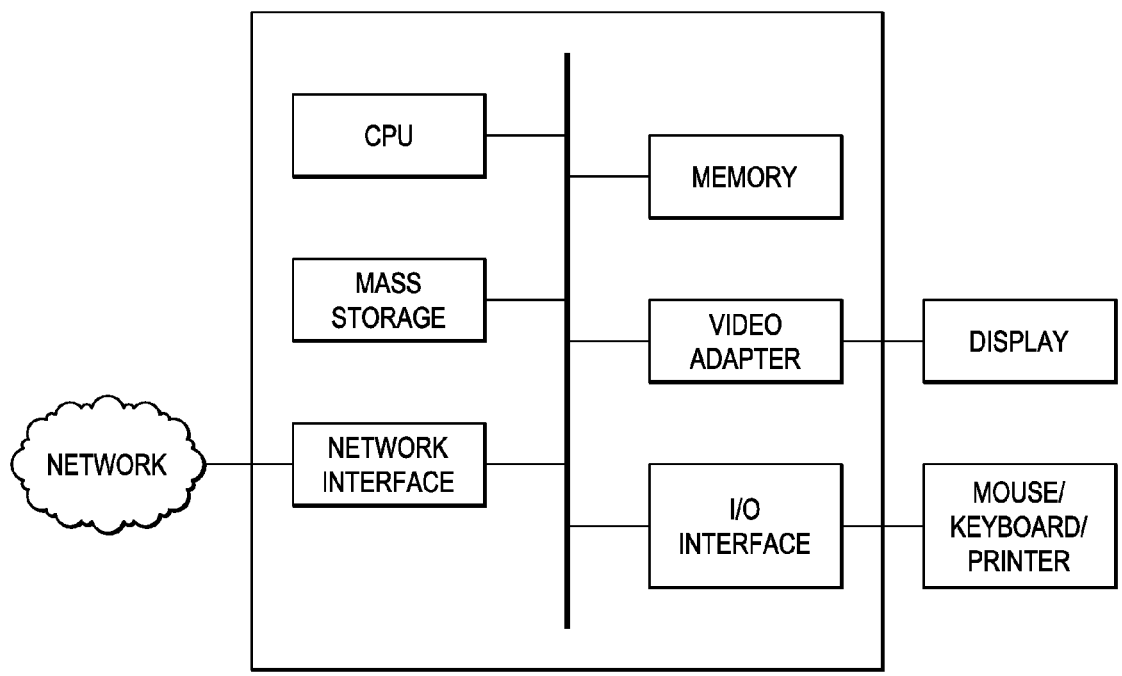
FIG. 26 illustrates a block diagram of an embodiment computing platform.

FIG. 26 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
communicating an Access Network Query Protocol (ANQP) request message carrying a query access point (AP) list ANQP-element from a requesting station (STA) to a responding STA, the ANQP request message requesting ANQP information for APs listed in an AP list field of the query AP list ANQP-element, the AP list field consisting of a one-octet AP list length field and a set of six-octet identifier fields, the set of the six-octet identifier fields specifying AP identifiers (IDs) of the APs listed in the AP list field; and
communicating an ANQP response message carrying an AP list response ANQP-element from the responding STA to the requesting STA prior to establishing an association between the responding STA and the requesting STA, the AP list response ANQP-element including discovery information for two or more of the APs listed in the the query AP list ANQP-element, wherein the AP list response ANQP-element includes AP Query response fields each of which carrying discovery information for a different one of the two or more of the APs listed in the query AP list ANQP-element.

2. The method of claim 1, wherein the ANQP request message further includes a plurality of query fields, and wherein each of the plurality of query fields requests discovery information for one of the APs listed in the AP list field.

3. The method of claim 1, wherein communicating the ANQP request message from the requesting STA to the responding STA comprises:
transmitting, by the requesting STA, the ANQP request message to the responding STA.

4. The method of claim 3, wherein communicating the ANQP response message from the responding STA to the requesting STA comprises:
receiving, by the requesting STA, the ANQP request message from the responding STA.

5. The method of claim 1, wherein communicating the ANQP request message from the requesting STA to the responding STA comprises:
receiving, by the responding STA, the ANQP request message from the requesting STA.

6. The method of claim 5, wherein communicating the ANQP response message from the responding STA to the requesting STA comprises:
transmitting, by the responding STA, the ANQP request message to the requesting STA.

7. The method of claim 6, further comprising:
retrieving, by the responding STA, the discovery information for each of the APs listed in the AP list field.

8. The method of claim 7, wherein retrieving the discovery information for each of the APs listed in the AP list field comprises:
sending a query request to a server; and
receiving a query response message from the server in response to the query request, the query response message providing the discovery information for the APs listed in the AP list field.

9. An apparatus comprising:
a processor; and
a computer readable storage medium storing programming for execution by the processor, the programming including instructions to:
communicate an Access Network Query Protocol (ANQP) request message carrying a query access point (AP) list ANQP-element from a requesting station (STA) to a responding STA, the ANQP request message requesting ANQP information for APs listed in an AP list field of the query AP list ANQP-element, the AP list field consisting of a one-octet AP list length field and a set of six-octet identifier fields, the set of six-octet identifier fields specifying AP identifiers (IDs) of the APs listed in the AP list field; and
communicate an ANQP response message carrying an AP list response ANQP-element from the responding STA to the requesting STA prior to establishing an association between the responding STA and the requesting STA, the AP list response ANQP-element including discovery information for two or more of the APs listed in the the query AP list ANQP-element, wherein the AP list response ANQP-element includes AP Query response fields each of which carrying discovery information for a different one of the two or more of the APs listed in the query AP list ANQP-element.

10. The apparatus of claim 9, wherein the ANQP request message further includes a plurality of query fields, and wherein each of the plurality of query fields requests discovery information for one of the APs listed in the AP list field.

11. The apparatus of claim 10, wherein the instructions to communicate the ANQP request message from the requesting STA to the responding STA include insructions to:
transmit the ANQP request message from the requesting STA to the responding STA.

12. The apparatus of claim 11, wherein the instructions to communicate the ANQP response message from the responding STA to the requesting STA include instructions to:
receive the ANQP request message from the responding STA at the requesting STA.

13. The apparatus of claim 9, wherein the instructions to communicate the ANQP request message from the requesting STA to the responding STA include insructions to:
receive the ANQP request message from the requesting STA at the responding STA.

14. The apparatus of claim 13, wherein the instructions to communicate the ANQP response message from the responding STA to the requesting STA include instructions to:
transmit the ANQP request message from the responding STA to the requesting STA.

15. The apparatus of claim 14, wherein the programming further includes instructions to:
retrieve the discovery information for each of the APs listed in the AP list field.

16. The apparatus of claim 15, wherein the instructions to retrieve the discovery information for each of the APs listed in the AP list field includes instructions to:
send a query request to a server; and
receive a query response message from the server in response to the query request, the query response message providing the discovery information for the APs listed in the AP list field.

17. A method comprising:
communicating an Access Network Query Protocol (ANQP) request message carrying a query access point (AP) list ANQP-element from a requesting station (STA) to a responding STA, the ANQP request message requesting ANQP information for an AP listed in an AP list field of the query AP list ANQP-element, the AP list field consisting of a one-octet AP list length field and a six-octet identifier field, the six-octet identifier field specifying an AP identifier (ID) of the AP listed in the AP list field; and
communicating an ANQP response message carrying an AP list response ANQP-element from the responding STA to the requesting STA prior to establishing an association between the responding STA and the requesting STA, the AP list response ANQP-element including discovery information for the AP listed in the query AP list ANQP-element, wherein the AP list response ANQP-element includes an AP Query response field carrying discovery information for the AP listed in the query AP list ANQP-element.

18. The method of claim 17, wherein communicating the ANQP request message from the requesting STA to the responding STA comprises:
transmitting, by the requesting STA, the ANQP request message to the responding STA.

19. The method of claim 18, wherein communicating the ANQP response message from the responding STA to the requesting STA comprises:
receiving, by the requesting STA, the ANQP request message from the responding STA.

20. The method of claim 17, wherein communicating the ANQP request message from the requesting STA to the responding STA comprises:
receiving, by the responding STA, the ANQP request message from the requesting STA.

21. The method of claim 20, wherein communicating the ANQP response message from the responding STA to the requesting STA comprises:
transmitting, by the responding STA, the ANQP request message to the requesting STA.

22. The method of claim 21, further comprising:
retrieving, by the responding STA, the discovery information for the AP listed in the AP list field.

23. An apparatus comprising:
a processor; and
a computer readable storage medium storing programming for execution by the processor, the programming including instructions to:
communicate an Access Network Query Protocol (ANQP) request message carrying a query access point (AP) list ANQP-element from a requesting station (STA) to a responding STA, the ANQP request message requesting ANQP information for an AP listed in an AP list field of the query AP list ANQP-element, the AP list field consisting of a one-octet AP list length field and a six-octet identifier field, the six-octet identifier field specifying an AP identifier (ID) of the AP listed in the AP list field; and
communicate an ANQP response message carrying an AP list response ANQP-element from the responding STA to the requesting STA prior to establishing an association between the responding STA and the requesting STA, the AP list response ANQP-element including discovery information for the AP listed in the query AP list ANQP-element, wherein the AP list response ANQP-element includes an AP Query response field carrying discovery information for the AP listed in the query AP list ANQP-element.

24. The apparatus of claim 23, wherein the instructions to communicate the ANQP request message from the requesting STA to the responding STA include insructions to:
transmit the ANQP request message from the requesting STA to the responding STA.

25. The apparatus of claim 24, wherein the instructions to communicate the ANQP response message from the responding STA to the requesting STA include instructions to:
receive the ANQP request message from the responding STA at the requesting STA.

26. The apparatus of claim 23, wherein the instructions to communicate the ANQP request message from the requesting STA to the responding STA include insructions to:
receive the ANQP request message from the requesting STA at the responding STA.

27. The apparatus of claim 26, wherein the instructions to communicate the ANQP response message from the responding STA to the requesting STA include instructions to:
transmit the ANQP request message from the responding STA to the requesting STA.

28. The apparatus of claim 27, wherein the programming further includes instructions to:
retrieve the discovery information for the AP listed in the AP list field.

* * * * *